Patented Jan. 3, 1933

1,893,393

UNITED STATES PATENT OFFICE

HERMANN BOLLMANN AND ALBERT SCHWIEGER, OF HAMBURG, GERMANY, ASSIGNORS TO HANSEATISCHE MUHLENWERKE AKTIENGESELLSCHAFT, OF HAMBURG, GERMANY, A JOINT-STOCK COMPANY OF GERMANY

PROCESS FOR THE REFINEMENT OF VEGETABLE PHOSPHATIDES

No Drawing. Application filed September 23, 1930, Serial No. 483,970, and in Germany October 21, 1929.

The present invention relates to a process whereby vegetable phosphatides which are used in many industries may be rendered more suitable for the purposes for which they are employed.

The phosphatides contained in vegetable materials, particularly soya lecithin, naturally possess a brownish-to-greyish dark color which makes them less suitable for many of the purposes for which they are intended to be used, even when only small quantities thereof are to be employed, for example in the preparation of food stuffs, as addition to margarine and bakery wares, or in their technical applications, for example in the textile industry, as constituents of printing pastes for delicate colours and the like.

Investigation has now shown that a considerable clarification and removal of the brown-grey colour tones of vegetable phosphatides may be obtained, without alteration, or injury of the phosphatides (which are themselves sensitive compounds), and further without any undesired impairment of the taste (indeed even with an improvement thereof), when the vegetable phosphatides are treated with hydrogen peroxide in the presence of water. The oil derived from the oil seeds and associated with vegetable phosphatides in the proportion of 30-40% which is important in giving the lecithin softness, is not unfavourably influenced by this treatment.

By the action of the hydrogen peroxide in aqueous solution the product assumes a light yellow colour, so that the vegetable lecithin is considerably more suitable for those purposes in which it is important to avoid colouring.

Furthermore, the treatment with hydrogen peroxide has a surprising effect in that the capacity for emulsification of the vegetable lecithin is considerably improved, probably on account of the formation of hydroxy acids, and in view of this the uses to which lecithin is put, show in the majority of cases, a considerable improvement.

The new process may be employed with vegetable lecithins which have been extracted from vegetable materials by any desired one of the known manufacturing processes. It is therefore equally allowable to treat vegetable lecithins which have been obtained by the extraction of vegetable material with benzene, a mixture of benzene and alcohol or with other solvents.

Since the phosphatide simultaneously extracted with the oil recovery as a rule contains a more or less great content of water from which the lecithin must be freed before it can be used for the purposes for which it is required, it is most advantageous to combine the hydrogen peroxide treatment for the purpose of bleaching and increasing the emulsification capacity of the lecithin, with the removal of the water for the purpose of drying the lecithin.

Under such conditions the phosphatide may be treated in an emulsified state with the hydrogen peroxide which is allowed to act upon the coloring matters present and is removed in the course of the subsequent treatment for the removal of excess water, which preferably is achieved by distillation of said water from the treated phosphatide under reduced pressure.

For carrying out the process one proceeds for example as follows:

The sorted and sliced soya beans are extracted with a solvent mixture consisting of 90 parts of benzene and 10 parts of alcohol of 96% by volume at a temperature of 20-30° C. After the completion of the extraction the extract is freed from the solvent by evaporation. Thereupon waste steam is led into the extract whereby the vegetable lecithin content in the oil separates and sinks to the bottom. This is separated and removed from the greater part of the associated oil by centrifuging, and then consists of about 60 parts of vegetable lecithin and 40 parts of oil with a water content of 30-40%. To 240 parts of this mixture consisting of lecithin, oil and water, 5.1 kgs. of a 30% aqueous solution of hydrogen peroxide are added; the mixture is then stirred without heating for a quarter of an hour to distribute the hydrogen peroxide uniformly. The mixture is then heated under a partial vacuum, say under an absolute pressure of 38 m. m. of mercury, to a temperature of 80–85° C., for 2–3 hours, which decomposes any remaining hydrogen peroxide and the water present in the mixture is in this manner evaporated, the lecithin being thereby simultaneously dried and bleached.

We claim:—

1. A process of refining vegetable phosphatides, consisting in treating the said phosphatides with hydrogen peroxide, and subsequently decomposing residual hydrogen peroxide, and removing the remaining water.

2. A process of refining vegetable phosphatides, consisting in treating soya lecithin with hydrogen peroxide and subsequently decomposing any remaining hydrogen peroxide and removing the water from the mixture.

3. In the refining of vegetable phosphatides, the steps of adding hydrogen peroxide to the phosphatide in the presence of water, and mixing well these materials together.

4. In the refining of vegetable phosphatides, the steps of adding hydrogen peroxide to the phosphatide in the presence of water and in the presence of fatty oil naturally occurring with said phosphatide, and mixing well these materials together.

5. A process of refining vegetable phosphatide which comprises treating the phosphatide in an emulsified condition with hydrogen peroxide and allowing the latter to act upon coloring matters present, and thereafter removing the excess of water present in the mixture.

6. A process of refining vegetable phosphatide which comprises treating the phosphatide in an emulsified condition with hydrogen peroxide and allowing the latter to act upon coloring matters present, and thereafter removing the excess of water present in the mixture by distillation of said water from the treated phosphatide, under partial vacuum.

7. Substantially water-free vegetable phosphatide having the properties of vegetable phosphatide treated with hydrogen peroxide, which latter is subsequently decomposed.

In testimony whereof we affix our signatures.

HERMANN BOLLMANN.
ALBERT SCHWIEGER.